United States Patent [19]
Dang Vu et al.

[11] Patent Number: 5,047,217
[45] Date of Patent: Sep. 10, 1991

[54] REACTOR WITH INTERNAL HEAT CONTROL BY HOLLOW HEAT EXCHANGER PLATES

[75] Inventors: Quang Dang Vu, Neuilly; Roland Huin, Montesson; Jean-Paul Euzen, Dardilly, all of France

[73] Assignee: Institut Francais du Petrole, Rueil-Malmaison, France

[21] Appl. No.: 288,365

[22] Filed: Dec. 22, 1988

[30] Foreign Application Priority Data

Dec. 23, 1987 [FR] France ............................... 87 18204

[51] Int. Cl.$^5$ ........................... B01J 8/02; F28D 9/00
[52] U.S. Cl. .................................. 422/200; 422/198; 422/211; 165/157; 165/177; 165/178
[58] Field of Search ............... 165/145, 86, 92, 109.1, 165/157, 177, 178; 422/135, 138, 198, 200, 211; 366/147

[56] References Cited

U.S. PATENT DOCUMENTS

| | | | |
|---|---|---|---|
| 2,460,987 | 2/1945 | Kanhofer | 422/200 |
| 3,434,804 | 3/1969 | Winn | 422/135 |
| 3,666,423 | 5/1972 | Muenger | 422/221 X |
| 3,893,811 | 7/1975 | Good et al. | 366/147 X |
| 3,927,987 | 12/1975 | Winter et al. | 422/218 X |
| 4,321,234 | 3/1982 | Ohsaki et al. | 422/200 |
| 4,525,482 | 6/1985 | Ohsaki et al. | |
| 4,544,544 | 10/1985 | Dang Vu et al. | 423/659 |

FOREIGN PATENT DOCUMENTS 3410592 9/1984 Fed. Rep. of Germany .
2130498 6/1984 United Kingdom .

OTHER PUBLICATIONS

"Perry's Chemical Engineers' Handbook", 6th ed. (1984), pp. 11-22, Column 2, 1st Paragraph.

Primary Examiner—David L. Lacey
Assistant Examiner—Jeffrey R. Snay
Attorney, Agent, or Firm—Millen, White & Zelano

[57] ABSTRACT

The invention provides an apparatus for carrying out chemical reactions, in the presence of at least one catalyst, in at least one reaction zone equipped with heat exchanger plates which make it possible to control the temperature of the zone. The apparatus mainly comprises a reactor, at least one central distributor manifold, a plurality of distributor manifolds, at least one central receiver manifold, a plurality of receiver manifolds and a plurality of continuous and elongate hollow plates, preferably substantially perpendicular. The hollow plates can contain adjacent channels having one of the following shapes: square, rectangular, triangular, sinusoidal.

23 Claims, 2 Drawing Sheets

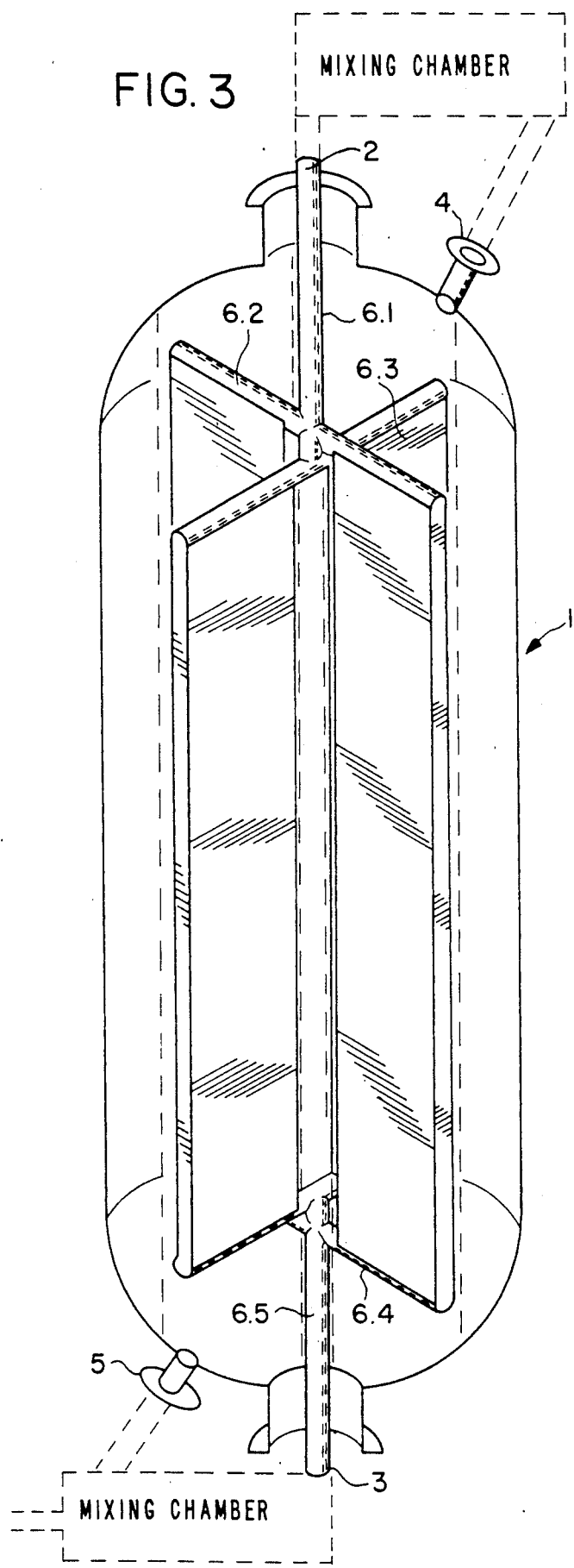

REACTOR WITH INTERNAL HEAT CONTROL BY HOLLOW HEAT EXCHANGER PLATES

BACKGROUND OF THE INVENTION

1. Field of the Invention

The invention relates to an apparatus, often used under pressure, for carrying out chemical reactions, generally in the presence of at least one catalyst, for example solid, in at least one reaction zone equipped with heat exchanger plates which make it possible to control the temperature of this reaction zone.

2. Description of the Prior Art

When the temperature of the reaction must be kept within relatively narrow limits, it is known to place in the catalytic bed a heat transfer apparatus, either based on tubes (GB-2,046,618), or based on plates (U.S. Pat. No. 3,666,423) or based on grids (U.S. Pat. No. 4,693,807), and to cause a fluid to flow inside this apparatus for the heat transfer and commonly called heat-carrying fluid.

The disadvantage in the use of a tube heat transfer apparatus is due to the fact that the connection between these individual tubes is very cumbersome and that, consequently, fitting the assembly is very difficult to carry out correctly inside the reactor. The disadvantage of the plate heat transfer apparatus of the patent U.S. Pat. No. 3,666,423 is its size and its low efficiency. To be able to withstand the reaction pressure, the plates are only partially hollowed out and the heat-carrying fluid thus has only a small portion of the surface of the plates available for carrying out its exchange work.

SUMMARY OF THE INVENTION

The present invention overcomes these drawbacks. The plates used in the invention work under very little stress which makes it possible to hollow them out completely and to let the heat-carrying fluid ensure the exchange through the whole of the available surface. In addition, fittings and the connections are sufficiently simple to be performed readily in the restricted space offered by the reactor.

BRIEF DESCRIPTION OF THE DRAWINGS

FIG. 3 shows the apparatus of the invention including influent and effluent mixing chambers and a catalyst bed in which the plates are positioned.

Figure 1:
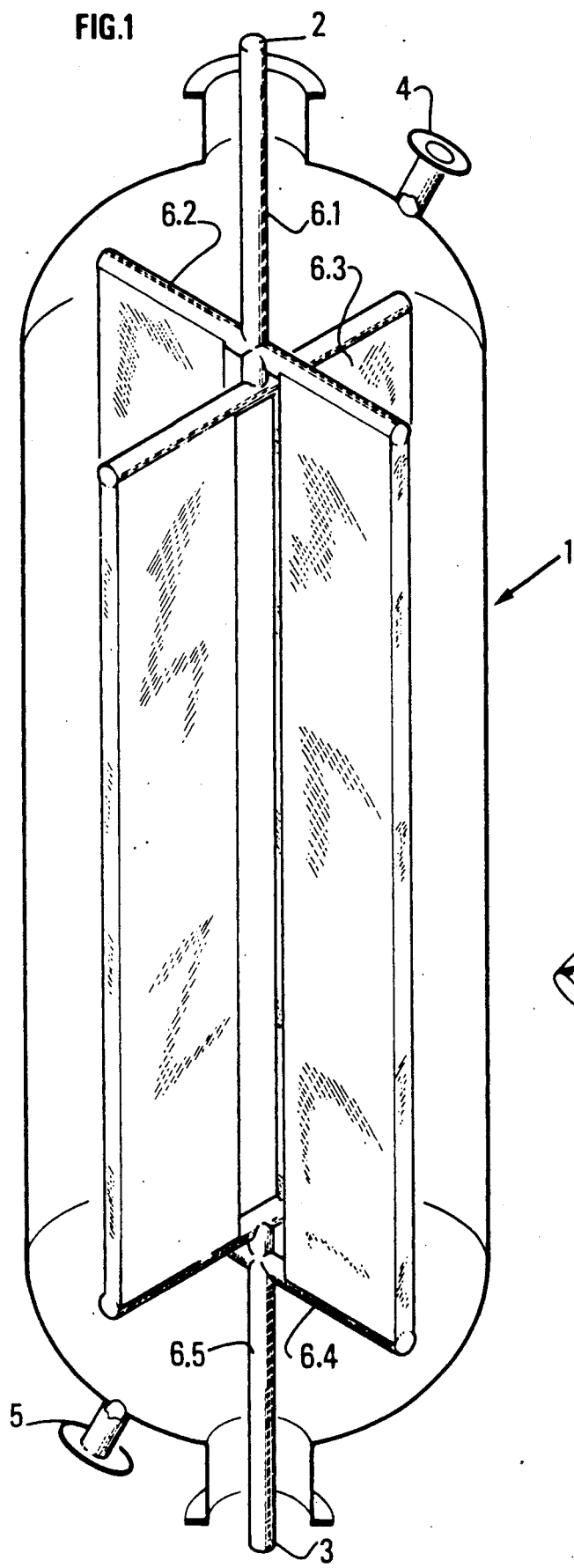
FIG. 1 shows the apparatus of the invention, the plates having been shown with flat faces (which corresponds to a preferred embodiment of the invention) so as not to overload the figure.

The object of the present invention is an apparatus (see FIG. 1) comprising; a reactor 1 of substantially cylindrical shape whose cross section has a substantially circular shape; at least one duct 2 for the introduction of a heat-carrying fluid; at least one duct 3 for removing said fluid; at least one duct 4 for introducing a charge into the reactor and at least one duct 5 for removing the reaction effluent from the reactor. The reactor further comprises:

a) at least one central distributor manifold 6.1, vertical for example, whose axis corresponds to the axis of the reactor, which is situated in the upper part of the reactor and is connected to duct 2;

b) a plurality of distributor manifolds 6.2, perpendicular to the axis of the reactor, these manifolds being connected individually to the central distributor manifold 6.1;

c) at least one central receiver manifold 6.5, for example vertical, whose axis corresponds to the axis of the reactor, which is situated in the lower part of the reactor and is connected to duct 3;

d) a plurality of receiver manifolds 6.4, perpendicular to the axis of the reactor, these manifolds being connected individually to the central receiver manifold 6.5;

e) a plurality of hollow plates, continuous and elongate, for the circulation of the heat-carrying fluid, each plate comprising an opening on to a distributor manifold 6.2 and an opening on to a receiver manifold 6.4.

Figure 2A:
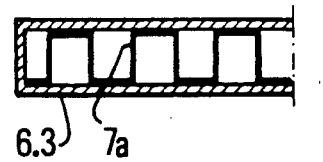
FIGS. 2a, 2b, 2c and 2d show plates according to different improvements of the invention.
Figure 2B:
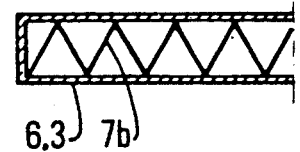

In an improvement of the invention, the faces of said hollow plates are formed by corrugated metal sheets whose corrugations may have one of the following forms: square, rectangular, triangular, sinusoidal and a herring bone pattern (see FIG. 2d), the aim being to create high turbulence in the flow of the heat-carrying fluid.

In another improvement of the invention, the central distributor manifold 6.1, the central receiver manifold 6.5, the distributor manifolds 6.2 and the receiver manifolds 6.4 may have circular sections so as to make the hollow plates more rigid.

In a preferred embodiment of the invention, the hollow plates are substantially parallelepipedic 6.3; each plate comprises then two wide parallel faces defining a plane disposed radially with respect to the axis of the reactor and four narrow faces, two of them being parallel to the axis of the reactor, the other two being perpendicular to this axis. In addition, each plate is connected, by its narrow upper face perpendicular to the axis of the reactor, to a distributor manifold 6.2, and, by its narrow lower face perpendicular to the axis of the reactor, to a receiver manifold 6.4. These four narrow faces, if required, need not be flat, but, for example, can be semi-cylindrical.

Figure 2C:
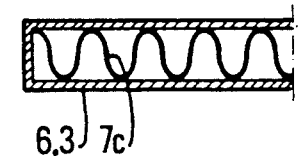
Figure 2D:
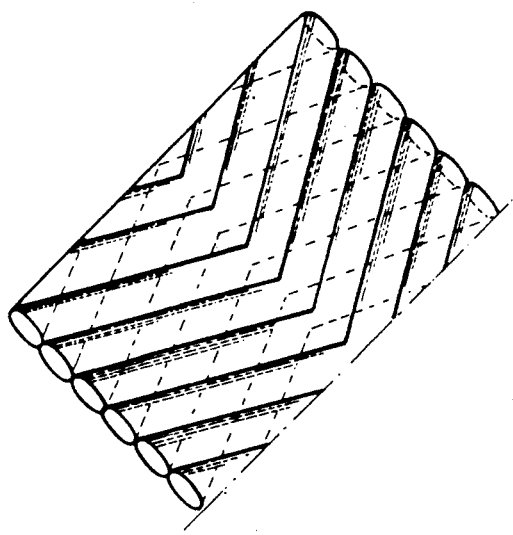

It should be noted that in this case adjacent channels may be formed in each of the substantially parallelepipedic hollow plates by means of corrugated metal sheets for improving the flow of the heat-carrying fluid, the sections of the channels having one of the following shapes: square, rectangular (see FIG. 2a), triangular (see FIG. 2b), or sinusoidal (see FIG. 2c). These channels connect together the two narrow faces perpendicular to the axis of the reactor in the same plate.

In a variant of the invention, the hollow plates may possibly have different widths, which makes it possible to maintain a minimum ratio between the reactor volume and the exchange surface, while avoiding too great a distance between any point of the reactor and the nearest plate.

The metal sheets possibly used in the different embodiments of the invention generally have a thickness less than ten millimeters, preferably less than three millimeters.

MORE DETAILED DESCRIPTION OF THE INVENTION

In FIG. 1, given by way of example, the path of the heat-carrying fluid through substantially parallelepipedic hollow plates will be described. The charge enters the reactor 1 through duct 4, passes through the catalytic bed contained in said reactor, then it leaves the reactor through duct 5. The heat-carrying fluid, for example autogenous (i.e. formed of one or more compo-
} nents constituting either the fresh charge or the reaction effluent), passes from duct 2 into the central distributor manifold 6.1. It is then divided between the distributor manifolds 6.2. The it penetrates into each of the hollow plates 6.3 through their narrow upper face perpendicular to the axis of the reactor, these hollow plates being disposed within the catalytic bed contained in the reactor 1. The fluid flows inside the hollow plates in the form of a sheet. On leaving the hollow plates, it is collected in the receiver manifolds 6.4 which are connected individually to the central receiver manifold 6.5 into which the fluid then passes. Finally, the fluid leaves the reactor through duct 3.

The fluid may be conveyed, for example, by drawing off by means of a pump (not shown in FIG. 1) placed at the outlet of reactor 1.

Generally, at least one of the components forming the charge is either in the liquid state, or in a state making its flow by means of a pump possible (super critical state).

In FIG. 1, the apparatus is shown in a substantially vertical position: the flow of the heat-carrying fluid and the charge may take place from top to bottom, as described above, but also from bottom to top. Similarly, the apparatus may be used in a substantially slanting position or in a substantially horizontal position: this is for example the case with a very long reactor, in which there is a substantial difference of the static pressure between the bottom and the top of the reactor.

In addition, in FIG. 1, the duct 4 for intake of the charge has been shown arbitrarily at the top of the reactor 1 and duct 5 for removal of the reaction effluent at the base of the reactor 1, but these ducts 4 and 5 may in fact be situated at any adequate level of the reactor.

FIG. 1 shows an axial reactor in which the reagents pass through the catalyst bed parallel to the axis of the reactor.

The invention also applies to a radial reactor comprising a permeable basket in the form of a cylindrical ring, e.g. defined by two coaxial cylinders, in which the catalyst and the hollow plates are disposed and in which the reagents pass through the bed perpendicularly to the axis of the reactor.

In an improvement of the invention, duct 3 for removal of the heat-carrying fluid and duct 5 for removing the reaction effluent emerge into the same chamber (not shown), this chamber being formed either inside or outside the reactor 1 and comprising another duct through which the heat-carrying fluid-reaction effluent mixture is withdrawn. This improvement is particularly used in the case of an autogenous heat-carrying fluid, for example formed from the reaction effluent. The heat-carrying fluid and the reaction effluent are, at the outlet of reactor 1, mixed in the chamber from which they leave together through the removal duct. The reaction effluent is then fed to subsequent conditioning (not shown) while the heat-carrying fluid, after suitable heat readjustment, is fed to duct 2.

In another improvement of the invention, ducts 2 and 4 come from the same mixing chamber into which the fresh reaction charge and the heat-carrying fluid coming from duct 3 are fed. In this case, the heat-carrying fluid is autogenous and formed, for example, from the fresh charge.

The advantage of an autogenous heat-carrying fluid is, on the one hand, that there is no pressure difference between the inside and the outside of the plates (apart from that created by the pressure drops due to flow of the fluids) and, on the other hand, that in the case of a leak, there is no danger of polluting the catalytic system.

FIGS. 2a, 2b, and 2c show, in another improvement of the invention, three substantially parallelepipedic hollow plates 6.3 in which adjacent channels 7a, 7b and 7c are formed from corrugated metal sheets. The sections of the channels have one of the following shapes: square, rectangular (7a), triangular (7b) and sinusoidal (7c), these channels connecting together the two narrow faces of the same plate perpendicular to the axis of the reactor. On the one hand, the presence of these adjacent channels ensures the strength of the hollow plates 6.3 which may reach and exceed, for example, ten meters in height. On the other hand, the channels avoid the formation of dead zones (i.e. zones through which the fluid does not pass), which dead zones might be formed because of the flow of the heat-carrying fluid in the form of a sheet inside the plates.

The metal sheets may be assembled together by welding, or much more economically by brazing by points or by immersion into a bath, or any other adequate technique.

The apparatus of the invention may be used in exothermic or endothermic processes for treating hydrocarbons.

What is claimed is:

1. An apparatus comprising a substantially cylindrical reactor having a substantially circular cross section, a central axis, an upper part, and a lower part, and said reactor is in fluid communication with, a first duct for the introduction of a heat-carrying fluid, a second duct for removal of heat-carrying fluid, at least one duct for introduction of a charge into said reactor and at least one duct for removal of reaction effluent from said reactor, further comprising:

a) a central distributor manifold, whose longitudinal axis corresponds to the axis of said reactor, which is situated in the upper part of the reactor and is in fluid communication with said first duct, b) a plurality of distributor manifolds, each having an axis perpendicular to the axis of said reactor, said plurality of distributor manifolds being individually in fluid communication with said central distributor manifold, c) a central receiver manifold, whose longitudinal axis corresponds to the axis of said reactor, which is situated in the lower part of said reactor and is in fluid communication with said second duct, d) a plurality of receiver manifolds, each having an axis perpendicular to the axis of said reactor, said plurality of receiver manifolds being individually in fluid communication with said central receiver manifold, e) a plurality of hollow plates, continuous and elongate, for the flow of heat-carrying fluid, each of said plates comprising an inlet means in fluid communication with one of said distributor manifolds and an outlet means in fluid communication with one of said receiver manifolds and each of said plates being disposed radially with respect to the axis of said reactor.

2. An apparatus according to claim 1, wherein said central distributor manifold and said central receiver manifold have circular cross sections with respect to their longitudinal axes.

3. An apparatus according to claim 1, wherein said distributor manifolds and said receiver manifolds have circular cross sections with respect to their axes.

4. An apparatus according to claim 1, wherein said second duct for removal of heat-carrying fluid and said duct for removal of reaction effluent are both in fluid communication with a chamber, said chamber comprising at least one other duct for removal of heat-carrying fluid-reaction effluent mixture.

5. An apparatus according to claim 1, wherein said first duct for introduction of heat-carrying fluid and said duct for introduction of a charge are both in fluid communication with a mixing chamber.

6. An apparatus according to claim 1, wherein said reactor contains a catalyst bed and said hollow plates are disposed within said catalyst bed.

7. An apparatus according to claim 1, wherein each of said hollow plates is in fluid communication with a single one of said distributor manifolds and a single one of said receiver manifolds.

8. An apparatus according to claim 1, wherein said hollow plates are formed by corrugated metal sheets.

9. An apparatus according to claim 8, wherein said corrugated metal sheets have a thickness less than three millimeters.

10. An apparatus according to claim 8, wherein said corrugated metal sheets have a thickness less than three millimeters.

11. An apparatus according to claim 8, wherein the corrugations of said metal sheets have a square shape.

12. An apparatus according to claim 8, wherein the corrugations of said metal sheets have a rectangular shape.

13. An apparatus according to claim 8, wherein the corrugations of said metal sheets have a triangular shape.

14. An apparatus according to claim 8, wherein the corrugations of said metal sheets have a sinusoidal shape.

15. An apparatus according to claim 8, wherein the corrugations of said metal sheets having a herring bone pattern.

16. An apparatus according to claim 1, further comprising a permeable basket having the shape of a cylindrical ring in which said hollow plates are disposed.

17. An apparatus according to claim 16, wherein said reactor further comprises a catalyst bed disposed within said permeable basket.

18. An apparatus according to claim 1, wherein said hollow plates are substantially parallelepedic, each of said plates comprising two wide parallel faces defining a plane disposed radially with respect to the axis of said reactor and four narrow faces being perpendicular to the axis of reactor, each of said plates being in fluid communication via its narrow upper face perpendicular with the axis of said reactor, to said one of said distributor manifolds and, via the narrow lower face perpendicular with the axis of said reactor, to said one of said receiver manifolds.

19. An apparatus according to claim 18 wherein adjacent channels are formed in each of said substantially parallelepipedic hollow plates by corrugated metal sheets, said channels connecting together the two narrow faces perpendicular to the axis of said reactor in the same plate.

20. An apparatus according to claim 19, wherein the cross section of each of said channels has a square shape.

21. An apparatus according to claim 19, wherein the cross section of each of said channels has a square shape.

22. An apparatus according to claim 19, wherein the cross section of each of said channels has a triangular shape.

23. An apparatus according to claim 19, wherein the cross section of each of said channels has a sinusoidal shape.

* * * * *